United States Patent [19]

van den Nieuwelaar et al.

[11] Patent Number: 5,133,686

[45] Date of Patent: Jul. 28, 1992

[54] CLOACA CUTTER

[75] Inventors: Adrianus J. van den Nieuwelaar, Gemert; Petrus C. M. Janssen, Wilbertoord, both of Netherlands

[73] Assignee: Stork PMT B.V., Boxmeer, Netherlands

[21] Appl. No.: 679,624

[22] Filed: Apr. 3, 1991

[30] Foreign Application Priority Data

Apr. 3, 1990 [NL] Netherlands ............... 9000782

[51] Int. Cl.$^5$ ............................................. A22C 21/00
[52] U.S. Cl. ..................................... 452/122; 452/120
[58] Field of Search ........................ 452/122, 109, 120

[56] References Cited

U.S. PATENT DOCUMENTS 2,943,346  7/1960  Jensen ............................... 17/11
4,023,237  5/1977  Meyn ................................ 452/122
4,564,977  1/1986  Scheier et al. ................... 452/109

FOREIGN PATENT DOCUMENTS 8625835  5/1987  Fed. Rep. of Germany .
7505057  4/1975  Netherlands .
2147190  9/1985  United Kingdom .

Primary Examiner—Willis Little
Attorney, Agent, or Firm—Hurt, Richardson, Garner, Todd & Cadenhead

[57] ABSTRACT

Device for cutting out the vent of a slaughtered bird, including an elongated centring pin, a rotatable cutting element with an axially directed cutting edge, and an axially movable positioning element. In an end position of the positioning element relative to a thickened end portion of the centring pin between these two elements an annular space is formed for the accommodation of the orbicular muscle of the vent, while in this end position between the positioning element and the thickened end portion of the centring pin an annular gap remains open with a width which is smaller than the thickness of the orbicular muscle.

4 Claims, 2 Drawing Sheets

CLOACA CUTTER

BACKGROUND OF THE INVENTION

1. Field of the Invention

This invention relates to a device for cutting out the vent of a slaughtered bird, comprising an elongated centring pin which is provided with a thickened end portion which can be inserted into the vent; a rotatable cutting element with an axially directed cutting edge, the axis of rotation running parallel to the axis of the centring pin, and the cutting edge being directed to and being movable towards the thickened end portion of the centring pin; and an axially movable positioning element of which the surface facing the thickened end portion of the centring pin is intended for interacting with the thickened end portion of the centring pin to position the vent.

2. Prior Art

A device as described above is known from U.S. Pat. No. 2,943,346. This specification describes a positioning element essentially comprising a hollow tube in which the centring pin is fitted in such a way that the thickened end portion of this pin, a cone, projects from the tube. Further, a partial vacuum is created in the tube by extracting air from it. When the cone is inserted far enough into the vent of a slaughtered bird, the skin around the vent comes into contact with one end of the tube. Due to the partial vacuum in the tube the skin is drawn against the end of the tube in the process. In this way the vent is positioned, and an incision can be made around the vent by means of the cutting element, which is moved in the direction of the thickened end portion of the centring pin. The cutting edge of the cutting element in this case moves away from the end of the tube, and the resulting radially directed forces on the orbicular muscle produce the risk of the orbicular muscle being pulled away from the positioning element. This is extremely undesirable, since in this case feces may come away from the intestine of the bird and can contaminate the meat.

If an attempt is made to overcome this problem by a stronger partial vacuum, there is a risk of the cut-out vent as a result being drawn into the tube and tearing the intestinal wall, again with the undesirable consequence of the contents of the intestine being released in an uncontrolled manner.

SUMMARY OF THE INVENTION

The object of the device according to the invention is to ensure good positioning of the vent between the end of the positioning element facing the thickened end portion of the centring pin and the thickened end portion of the centring pin without the risk of uncontrolled release of feces or uncontrolled damage to the intestinal wall.

This object is attained according to the invention in that in an end position of the positioning element relative to the thickened end portion of the centring pin between these two elements an annular space is formed for the accommodation of the orbicular muscle of the vent, while in this end position between the positioning element and the thickened end portion of the centring pin an annular gap remains open with a width which is smaller than the thickness of the orbicular muscle.

In an advantageous embodiment of the device the axial length of the annular space is greater than the thickness of the orbicular muscle. An annular space with such an axial length, which length is measured from the annular gap between the positioning element and the thickened end portion of the centring pin, provides an axially loose accommodation of the orbicular muscle and thus diminishes stress in the bird's skin around the orbicular muscle in the process of moving the positioning element in the direction of the thickened end portion of the centring pin.

It has been found advantageous to choose the axial length of the annular space at least about 0.007 m, and more advantageously 0.012 m.

The optimum width of the annular gap, as well as the axial length of the annular space, depend on the species of birds to be processed. For chickens, the width of the annular gap may lie in the interval of about 0.0002–0.0005 m, while for turkeys the width of the annular gap may lie in the interval of about 0.0004–0.0007 m.

Other advantages will be more readily appreciated as the same becomes better understood by reference to the following detailed description and considered in connection with the accompanying drawings in which like reference symbols designate like parts.

DESCRIPTION OF THE PREFERRED EMBODIMENTS

Figure 1:
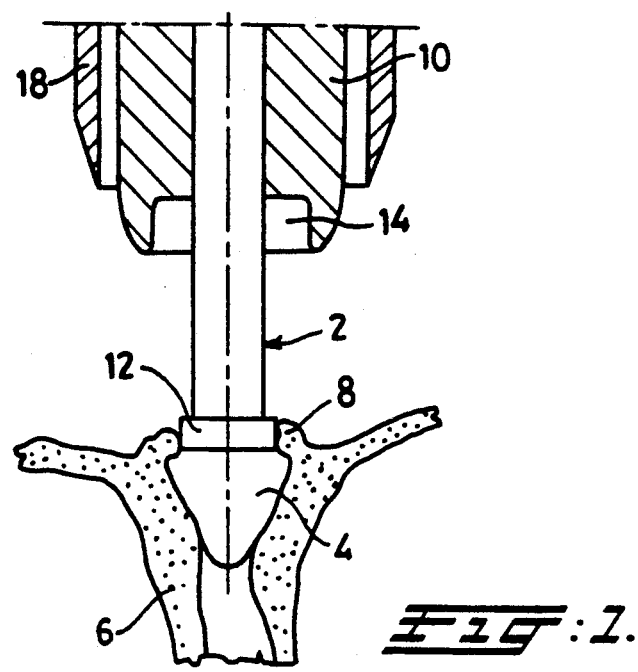
FIG. 1 shows a partial cross-section of an embodiment of the device according to the invention, in which the thickened end portion of the centring pin is inserted into the cloaca of a bird.

FIG. 1 shows a centring pin 2 which is provided with a thickened end portion in the form of a cone 4. The cone 4 is inserted into the vent of a slaughtered bird, of which bird only the end of the intestine 6 is shown schematically. The bird is suspended by both legs from a hook and is positioned by means of devices, not shown in any further detail, in a slaughter line relative to the device of which centring pin 2 forms part. Other drive and positioning means which, although they belong to a device according to the invention, are not essential for a description thereof are not shown either.

The largest diameter of the cone 4 is such that during the insertion thereof into the anus the orbicular muscle 8 stretches, following which it closes again partially around the top part of the cone 4.

Figure 2:
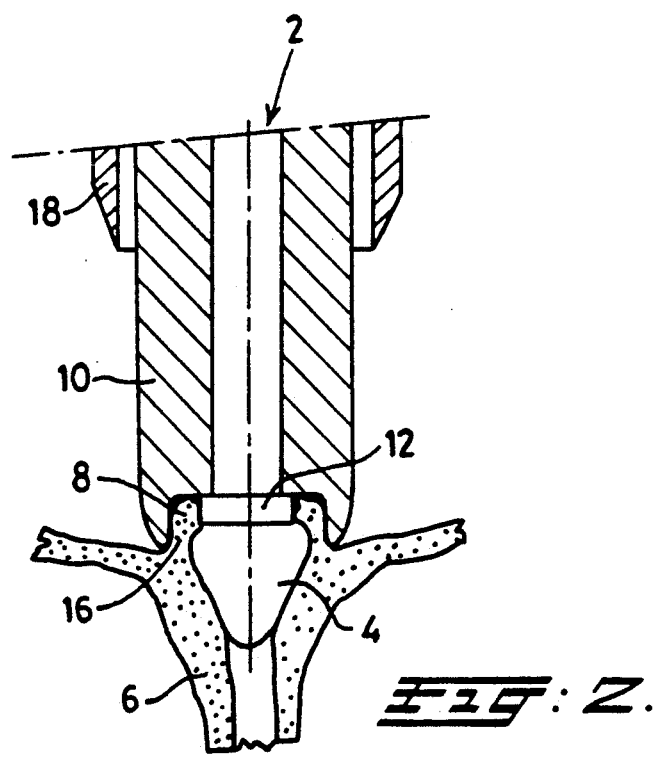
FIG. 2 shows the positioning of the vent on the thickened end portion of the centring pin with the aid of a positioning element, in a partial cross-section according to FIG. 1.

Fitted in a sliding manner on the centring pin 2 is a positioning element 10 which is movable in the direction of the cone 4 until it meets the stop 12. This situation is shown in FIG. 2. The positioning element 10 comprises an annular cavity 14 with a diameter which is larger than the largest diameter of the cone 4.

FIG. 2 shows that the cone 4, the stop 12 and the cavity 14 together determine a space whose cross-section is equal to or greater than the cross-section of the orbicular muscle 8. On the other hand, an annular gap 16 is left between the cone 4 and the bottom end of the positioning element 10, which gap is wide enough to accommodate the skin and the intestinal wall, but is not wide enough to accommodate the orbicular muscle. The orbicular muscle is thus confined in the above-mentioned space, and a rotating cutting element 18 can be moved parallel to the central axis of the centring pin 2 in the direction of the cone 4, in which case the vent of the bird is cut out.

Figure 3:
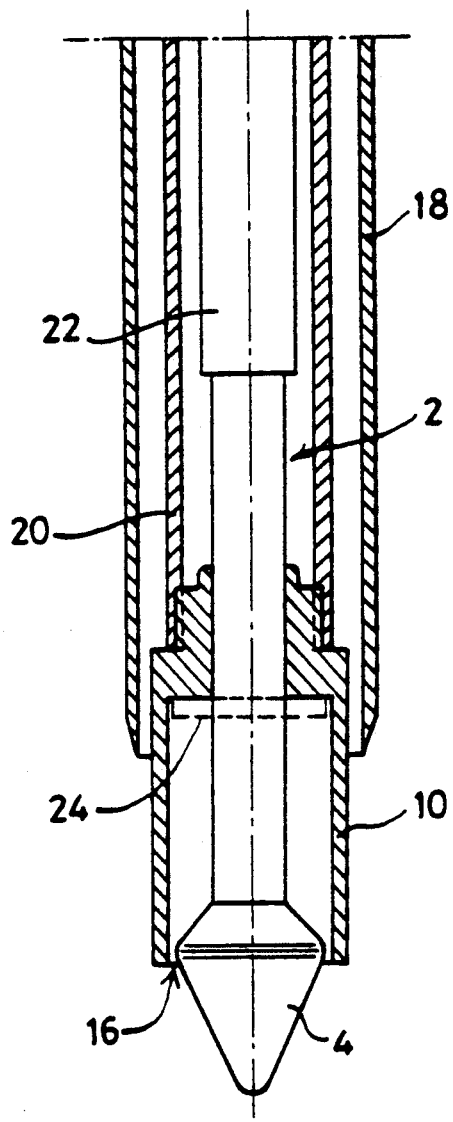
FIG. 3 shows a partial cross-section of another embodiment of the device according to the invention in the position of FIG. 2, the cloaca not being shown.

FIG. 3 shows a device with a large annular space defined by the positioning element 10 and the thickened end portion 4 of the centring pin 2. The positioning element 10 is fixed to a tube 20. The centring pin 2 is fixed, e.g. screwed, to a rod 22 which has a slightly larger diameter than the centring pin 2. Thus, a stop edge is formed at the transition from rod 22 to pin 2 by means of which the axial movement of the centring pin 2 relative to the positioning element 10 in one direction is limited. Similarly, the axial movement of the centring pin 2 relative to the positioning element 10 in the other direction may be limited by a stop ring 24 indicated in dashed lines, the stop ring 24 being fixed to the centring pin 2. The large annular space ensures an excellent operation of the device.

It will be clear that the dimensions of the space and the gap are adapted to the orbicular muscle dimensions of the species of birds to be processed.

What is claimed is:

1. A device for cutting out the vent of a slaughtered bird, comprising:

an elongated centring pin which is provided with a thickened end portion which can be inserted into the vent;

a rotatable cutting element with an axially directed cutting edge, the axis of rotation running parallel to the axis of said centring pin, and the cutting edge being directed to and being movable towards said thickened centring pin end portion; and an axially movable retaining element of which the end facing said thickened centring pin end portion is intended for interacting with said thickened centring pin end portion to retain the vent;

wherein in an end position of said retaining element relative to said thickened centring pin end portion between said two elements a semi-closed annular space is formed for the confinement of the orbicular muscle of the vent, while in said end position between said retaining element and said thickened centring pin end portion an annular gap remains open with a width which is smaller than the thickness of the orbicular muscle.

2. A device according to claim 1, wherein the axial length of said annular space is greater than the thickness of the orbicular muscle.

3. A device according to claim 2, wherein the axial length of said annular space is at least about 0.007 m.

4. A device according to claim 1, wherein the width of said annular gap is at least about 0.0002 m and does not exceed about 0.001 m.

* * * * *